United States Patent [19]

Boyer

[11] 3,963,113
[45] June 15, 1976

[54] CONVEYOR BELTS FOR TRANSPORTING TAR SANDS

[75] Inventor: Jackson S. Boyer, Wilmington, Del.

[73] Assignee: Sun Oil Company of Pennsylvania, Philadelphia, Pa.

[22] Filed: Aug. 20, 1975

[21] Appl. No.: 606,150

Related U.S. Application Data

[62] Division of Ser. No. 509,205, Sept. 25, 1974.

[52] U.S. Cl. ............................. 198/193; 428/114; 428/295; 428/461
[51] Int. Cl.² ........................................ B65G 15/30
[58] Field of Search ............... 198/193, DIG. 7; 428/114, 295, 461, 462, 463, 494; 260/5, 42.26, 42.37, 894, 30.6, 31.8, 31.4

[56] References Cited
UNITED STATES PATENTS

| | | | |
|---|---|---|---|
| 3,529,868 | 9/1970 | Hogg | 299/7 |
| 3,596,753 | 8/1971 | Knapp et al. | 428/295 |
| 3,838,098 | 9/1974 | Kent | 260/5 |
| 3,857,775 | 12/1974 | Custer et al. | 260/5 |
| 3,872,036 | 3/1975 | Todani et al. | 260/5 |
| 3,900,627 | 8/1975 | Angioletti et al. | 428/114 |

FOREIGN PATENTS OR APPLICATIONS 922,655    3/1973    Canada

*Primary Examiner*—Marion E. McCamish
*Assistant Examiner*—William R. Dixon, Jr.
*Attorney, Agent, or Firm*—J. Edward Hess; Donald R. Johnson; Anthony Potts, Jr.

[57] ABSTRACT

A method for transporting tar sands in an open pit mine utilizing novel flexible belt conveyors between a receiving area and a discharge area which comprises providing a conveyor belt having an upper surface layer of a novel elastomeric material which is flexible at low temperatures and is substantially resistant to excess swelling when exposed to petroleum liquids containing up to 30 volume percent aromatics at temperatures in the range of −60°F to +100°F, applying a thin layer of said petroleum liquid to the surface of said belt and thereafter transferring tar sands on said belt from a receiving area to a discharge area.

4 Claims, No Drawings

CONVEYOR BELTS FOR TRANSPORTING TAR SANDS

CROSS REFERENCE TO RELATED APPLICATIONS

This application is a division of copending application Ser. No. 509,205 filed Sept. 25, 1974.

BACKGROUND OF THE INVENTION

Large quantities of tar sands can be found in relatively shallow deposits in various localities throughout the world. The largest of these deposits is found in the Canadian province of Alberta. These deposits which are commonly referred to as Athabasca tar sands contain upwards of 350 billion barrels of recoverable bitumen and underlie more than 3000 square miles at depths of 0 to 2000 feet. A large part of these tar sands can be recovered by open pit strip mining. The province of Alberta is well known for its long harsh bitter cold winters and its short but often hot summers. Temperatures over a twelve-month period ranging from a low of −50°F to a high of 95°F are not unusual in northern Alberta. Mining tar sands under these conditions presents some unique problems of digging and transportation heretofore not encountered.

Bituminous tar sands such as the Athabasca tar sands comprise a siliceous material, generally having a size greater than that passing a 325 mesh screen, saturated with a relatively heavy, viscous bitumen in quantities of from 5 to 21 weight percent of the total composition. More typically, the bitumen content of the sands is about 8 to 15 percent. This bitumen is quite viscous and contains typically 4.5 percent sulfur and 38 percent aromatics. Its specific gravity at 60°F ranges typically from about 1.00 to about 1.06. The tar sands also contain clay and silt in quantities of from 1 to 50 weight percent of the total composition. Silt is normally defined as mineral which will pass a 325 mesh screen but which is larger than 2 microns. Clay is mineral smaller than 2 microns including some siliceous material of that size.

There are several well-known processes for effecting separation of bitumen from the tar sands. In the so-called "cold water" method, the separation is accomplished by mixing the sands with a solvent capable of dissolving the bitumen constituent. The mixture is then introduced into a large volume of water, water with a surface agent added, or a solution of a neutral salt in water. The combined mass is then subjected to a pressure or gravity separation.

In the hot water method, the bituminous sands are jetted with steam and mulled with a minor amount of hot water at temperatures in the range of 140°F to 210°F. The resulting pulp is dropped into a stream of circulating hot water and carried to a separation cell maintained at a temperature of about 150°F to 200°F and usually 185°F. In the separation cell, sand settles to the bottom as tailings and bitumen rises to the top in the form of an oil froth. An aqueous middlings layer containing some mineral and bitumen is formed between these layers. A scavenger step may be conducted on the middlings layer from the primary separation step to recover additional amounts of bitumen therefrom. This step usually comprises aerating the middlings as taught by K. A. Clark, "The Hot Water Washing Method", Canadian Oil and Gas Industries 3, 46 (1950). These froths can be combined, diluted with naphtha, and centrifuged to remove more water and residual mineral. The naphtha is then distilled off and the bitumen is coked to a high quality crude suitable for further processing. The hot water process is described in detail by Floyd et al. in Canadian Pat. No. 841,581 issued May 12, 1970.

The tar sands must be mined from their deposits for charge into the particular process used to effect separation of the bitumen from the sands. In one particular mining operation, overburden is first removed from the deposits. This involves the stripping away of trees, muskeg, and earth which overlie the tar sands. The sands are then mined by giant bucketwheel excavators. The digging wheels on such excavators can have ten or more buckets each bucket capable of biting out and holding nearly two tons of sand. Sand dug by the wheel travels the length of the digger by conveyor to the discharge boom and is dropped on the first of several conveyor belts.

One particular operation utilizes a first conveyor which is 4,600 feet long, 60 inches wide, and made of one-inch thick rubber which is a vulcanized mixture of about 15 percent natural rubber and about 85 percent styrene-butadiene copolymer rubber on steel cords. It travels at 1,050 feet per minute, or about 12 miles per hour. The sand is dumped from the first conveyor onto a second which is 60 inches wide and about 1000 feet long. As diggers get farther from the initial mining area, the second conveyor is extended and ultimately both conveyors stretch several miles. The second conveyor drops sand onto a third conveyor. This third belt, 72 inches wide, runs 1,350 feet to the separation plant. This system has been used commercially at Fort McMurray, Alberta, for a number of years.

Although belt conveyors have been widely used in other mining operations, there are some new problems peculiar to the handling of tar sands. Up until now conveyor belts were made from natural rubber or styrene-butadiene copolymer or mixtures of the two. These compounds are selected because they retain good flexibility over a wide temperature range, e.g., −60°F to 150°F. However, when these belts are used in a tar sands mining operation, it has been observed that large quantities of the sands stick to the belts causing fouling and a decrease in belt capacity.

Depending on the character of the feed material and the outside temperature, the layer of sticking sands attains a thickness of as much as one-half inch. In warm weather the belt deposit increases in toughness and thickness. In cold weather, the deposit becomes frozen in transit from the mining area to the processing area. Steam jets and scrapers have been proposed for the purpose of removing the deposit but none of these means has been fully satisfactory. Accumulation of sands on the conveyor belts causes unbalanced loads, straining problems, and additional wear on pulleys, idlers, and scrapers.

Canadian Pat. No. 922,655 issued Mar. 13, 1973 to William Hogg discloses an improvement to a process for transporting bituminous tar sands on a conveyor belt between a receiving area and a discharge area which generally comprises applying a layer of an aqueous liquid medium to the surface of the conveyor prior to transporting tar sands on the belt surface. The aqueous layer reduces the tendency of the tar sands to stick to the belt when discharged at the discharge area. When operating this process at temperatures above freezing, it has been found to be reasonably effective.

However, when the temperature falls below freezing, it is necessary to add freezing point depressants such as alcohols to keep the water from freezing on the belt surface. Ethylene glycol is one of the preferred additives because of the safety of its use as well as its compatibility with subsequent tar sand processing steps. However, the relatively high expense of ethylene glycol, particularly in colder climates, reduces its attractiveness as an answer to the conveyor belt cleaning problem. Thus, although the disclosure of the above Canadian patent provides one technically feasible means of reducing the problems of transporting tar sands on a conveyor belt system, substantial room for improvement still exists.

One method employed to overcome the problem of tar sands sticking to the surface of natural rubber or styrenebutadiene rubber conveyor belts has been the addition of kerosene to the surface of the belt before the tar sands are placed thereon. During cold weather operation, that is at ambient temperatures below 10 F, this method of keeping conveyor belts reasonably clean has been generally acceptable. However, when the temperature rises above 10 F the natural rubber or styrene-butadiene rubber will absorb the aromatic hydrocarbon liquids of the kerosene and begin to swell. The aromatic swollen belt would often expand to the degree that it becomes inoperable and the belt must be shut down.

One approach to overcome the swelling of the conveyor belt caused by application of liquid hydrocarbons is to select a rubber composition for the belt surface which is resistant to swelling. A rubber well-known for its resistance to petroleum liquids is nitrile rubber.

In *The Vanderbilt Rubber Handbook* edited by G. G. Winspear (R. T. Vanderbilt, Inc., New York, 1968) pages 99 to 118, methods of preparation as well as physical and chemical characteristics of nitrile rubber are disclosed. It is disclosed in this text that the oil and chemical resistance of nitrile rubber is the major factor dictating its use. The oil resistance of compounds based on nitrile rubber is determined by the acrylonitrile content of the nitrile rubber. Also, it is disclosed that the low temperature properties of nitrile rubber compounds vary with the acrylonitrile content of the polymer and the type of plasticizer incorporated therein.

It is also disclosed that nitrile rubber has a wide range of compatibility with other polymers, making possible a great variety of unique and desirable properties. Blends can be made with vinyl chloride, phenolic and ABS resins, SBR, polychloroprene, cis polybutadiene, chlorosulfated polyethylene, thiokol, and to a certain extent, natural rubber. All of these blends are used to impart variations in processing, ozone resistance, low temperature flexibility and cost. The use of nitrile rubber for conveyor belts is disclosed. Yet with all this information available, the industry has up until this point been unable to provide a flexible rubber conveyor belt suitable to transport tar sands in an open pit mine without having to shut the belt down because of tar sands sticking to the belt surface.

By the method of the present invention using the novel elastomer compositions herein provided, tar sands can be efficiently and economically transported in an open pit mine under a wide range of weather and temperature conditions.

DESCRIPTION OF THE INVENTION

Transportation of tar sands on rubber conveyor belts in an open pit mine is a process which has only recently been tested on a commercial scale. Rubber conveyor belts which have the physical characteristics necessary to perform satisfactorily in this procedure have not heretofore been available. The present invention provides novel conveyor belts of novel rubber compositions which meet these requirements.

To operate twelve months a year in a climate such as that which exists in northern Alberta, Canada, a conveyor belt must be maintained substantially free of tar sand build up and be flexible at temperatures between 100 F and 100 F.

It has been determined that a conveyor belt composition which has a volume percent increase of 40 or less according to the procedures of ASTM D-471 when immersed in number 3 ASTM oil for 24 hours will not swell to the point that it is inoperable at temperatures up to 100 F when coated during normal use to prevent tar sand buildup with kerosene or any liquid hydrocarbon mixture containing up to 30 volume percent aromatics.

The present invention provides a flexible continuous conveyor belt having a novel rubber surface which can be exposed to liquid hydrocarbons containing up to 30 weight percent aromatics over a wide range of temperatures without causing the belt to become inoperable because of excessive swelling of the rubber in the belt. At the same time the rubber in this conveyor has sufficient low temperature flexibility to permit the conveyor to operate at temperatures down to 100 F.

The present invention provides novel rubber compositions particularly suited for use in rubber conveyor belts used to transport tar sands. The present invention also provides a method for transporting tar sands in an open pit mine subject to a wide range of temperatures in a manner whereby adherence of sticky tar sands to the belt surface is substantially reduced.

Normally in transporting tar sands or any mineral ore, the conveyor belt is supported on idler rollers or equivalent support means so that it is shaped as a long trough. The belt must have good abrasion resistance as well as good tensile properties. Most importantly the belt must be flexible over a wide temperature range.

The essential element in providing a process for transporting tar sands as herein disclosed is the composition on the surface of the conveyor which comes in contact with tar sands. This composition, if rubber, must meet the critical requirements of controlled swell when contacted with aromatic liquid hydrocarbons as well as low temperature flexibility which is critical to operating a conveyor belt in cold northern climates. As discussed above, none of the prior art elastomer compositions have been found which meet these critical requirements.

It has been discovered that specific blends of nitrile rubber and certain other liquid and solid plasticizers prepared to form a conveyor belt as herein disclosed provides a conveyor system which when coated with liquid petroleum hydrocarbons containing up to thirty volume percent aromatics is effective in transporting tar sands in an open pit mine under a wide range of temperature conditions. By this method the conveyor belt remains substantially free off excessive tar sands adhering thereto.

Specifically an improved rubber composition suitable for use over a wide range of temperatures and resistant to excess swelling when exposed to aromatic-containing liquid hydrocarbons has been discovered. This rubber composition comprises a vulcanized mixture of:

a. 100 parts of a rubber mixture comprised of 20 to 95 weight percent nitrile rubber and 80 to 5 weight percent of a second rubber selected from the group consisting of polybutadiene, styrene-butadiene copolymer, neoprene, polyisoprene and natural rubber said rubber mixture having an acrylonitrile content in the range of 5 to 35 weight percent and b. 1 to 30 parts by weight of a liquid plasticizing agent compatible with said mixture, said vulcanized mixture being characterized as having a volume percent swell after 24 hours in ASTM number 3 oil at 158°F in the range of 1 to 40 as measured according to ASTM D-471 and a Gehman $T_{100}$ stiffness value in the range of −30°F to −100°F as measured according to ASTM D-1053.

The novel vulcanized rubber compositions of the present invention are prepared as a blend of nitrile rubber, a second rubber selected from the group given above which serves as a solid plasticizing agent for the nitrile rubber and a liquid plasticizing agent which is compatible with the mixture.

Nitrile rubber is prepared by copolymerizing acrylonitrile and butadiene in accordance with procedures such as those outlined on pages 99 to 117 of the *Vanderbilt Rubber Handbook* noted above. The copolymer can be prepared so that the desired level of acrylonitrile is present to provide the necessary weight percent of acrylonitrile in the final rubber mixture. On a commercial basis nitrile rubber compositions containing 20, 28, 33, 40, and 50 weight percent acrylonitrile are available. The nitrile rubber is blended by any of the means well known in the art with the second rubber additive of the composition to provide a rubber mixture containing an acrylonitrile content in the desired 5 to 35 weight percent range based on the weight of the rubber mixture.

A liquid plasticizing agent which is compatible with the rubber is also blended with the mixture. This mixture is thereafter blended with known vulcanizing additives and vulcanized to provide the novel rubber compositions suitable for use in the applications herein disclosed.

Nitrile rubber, although highly resistant to swell in the presence of liquid hydrocarbons, becomes stiff and inflexible at low temperatures. A liquid plasticizing agent can be added to the nitrile rubber to improve its low temperature flexibility. However, liquid hydrocarbons and in particular aromatic-containing liquid hydrocarbons are known to extract the liquid plasticizer from the nitrile rubber thereby negating the flexibility improvement achieved by the addition of the plasticizer. The extraction of the plasticizer from a nitrile rubber is observed in one way by negative swelling which sometimes is measured by the procedures of ASTM D-741 using ASTM number 3 oil for 24 hours at 158°F. A nitrile rubber composition containing a plasticizing agent which is found to have a negative volume swell as measured according to the above procedures generally does not have the low temperature flexibility to render it useful in many applications and in particular for use in conveyor belts transporting tar sands. Data regarding the effects of ASTM number 3 oil on plasticized nitrile rubber can be found in an article "Tech Book Facts CHEMIGUM COMPOUNDING CC-42" published by the Goodyear Chemicals Division of The Goodyear Tire and Rubber Company of Akron, Ohio.

Now, it has been discovered that by adding a second rubber which functions as a solid plasticizing agent to the nitrile rubber and the liquid plasticizing agent, a rubber mixture can be provided which when vulcanized has the necessary physical characteristics to meet the requirements of the desired uses, in particular the use of transporting tar sands in an open pit mine.

The second rubber in the mixture which serves as a solid plasticizing agent for the compositions of the present invention can be selected from the group consisting of polybutadiene, styrene-butadiene copolymer, neoprene, polyisoprene and natural rubber. Each of these elastomers are well known to those skilled in the art.

The mixtures of the nitrile rubber and the second rubber should be comprised of 20 to 95 weight percent nitrile rubber and 80 to 5 weight percent of the second rubber. The preferred composition of the mixture is 40 to 90 weight percent nitrile rubber and 60 to 10 weight percent of the second rubber. In all compositions the acrylonitrile content must be in the range of 5 to 35 weight percent based on the weight of the mixture. The second rubber component in the mixture can be any of the disclosed second rubber additives or mixtures thereof. For example, the second rubber additive can contain 50 weight percent polybutadiene and 50 weight percent styrene-butadiene copolymer.

A wide variety of suitable plasticizers which are compatible with nitrile rubber and the second rubber, are well known to those skilled in the art. These plasticizers in general include esters of bibasic acids as well as synthetic liquid polymers. As those skilled in the art know, a plasticizer is considered compatible if there is no significant migration of the plasticizer from the rubber compound after storage at room temperature for a period of four to six weeks after the mixture has been prepared. On occasion slight migration of a compatible plasticizer to the surface of the rubber compound may occur, but unless there is substantial migration, the plasticizer is considered compatible. Included among those plasticizers but not limited thereto are trioctyl phosphate, dibutyl sebacate, diisooctyl sebacate, tributyl citrate, di(butoxy-ethoxy-ethyl) formal, di(butoxy-ethoxy-ethyl) adipate, dioctyl sebacate, dioctyl phthalate, dibutyl phthalate and tributoxy oxyethyl phosphate. The liquid plasticizer can be added to the rubber mixture in quantities of 1 to 30 parts by weight per 100 parts of the rubber mixture. The preferred quantity of liquid plasticizer added to the rubber mixture is 20 to 30 parts plasticizer per 100 parts of rubber. The preferred liquid plasticizers are di(butoxy-ethoxy-ethyl) formal and di(butoxy-ethoxy-ethyl)adipate.

The rubber compositions can also contain reinforcing agents where the use requires. Reinforcing agents suitable for use include carbon black, hard clays and hydrated silica with carbon black being preferred. The reinforcing agent can be added to the rubber mixture in quantities of 30 to 60 parts reinforcing agent per 100 parts by weight of rubber mixture, with 45 to 55 parts of reinforcing agent per 100 parts of rubber mixture being preferred. The reinforcing agent is added primarily to improve properties other than low temperature flexibility and volume percent swell in liquid hydrocarbons. Normally the effect on these properties is minimal. Accordingly, although the reacted swell and stiffness properties apply to the reinforced composition when a reinforcing agent is employed, the unreinforced composition will also have the recited swell and stiffness properties. Standard well known vulcanizing agents are also added to the rubber composition by methods well known in the art and the rubber compound can be vulcanized by standard procedures well known in the art for vulcanizing nitrile rubber.

As one means of further defining one mode of the compositions of the present invention a series of six rubber compositions were prepared using nitrile rubber, a second rubber and a liquid plasticizer compatible with nitrile rubber. The compositions and their respective components are listed respectively as examples 1 through 6 in the table herein provided.

Examples 1 through 5 disclose compositions containing varying quantities of acrylonitrile in the rubber according to the invention herein provided. Example 6 is a composition having a quantity of acrylonitrile in the rubber mixture which is outside the limits provided for the compositions of this invention. As is disclosed, the physical properties of the rubber composition of Example 6 fail to meet the necessary limitations of the compositions of this invention. Thus the composition of limited resistance to swelling when exposed to liquid hydrocarbons containing up to 30 weight percent aromatics. The conveyor belt comprises a rubber belt having a plurality of metal cables longitudinally disposed in said belt and arranged substantially parallel to each other. The rubber component of the belt, or at least the surface thereof, preferably comprises a vulcanized mixture of:

a. 100 parts by weight of a rubber mixture containing 20 to 95 weight percent nitrile rubber and 80 to 5 weight percent of a second rubber selected from the group consisting of natural rubber, neoprene, polybutadiene, styrene-butadiene copolymer and polyisoprene said rubber mixture having an acrylonitrile content in the range of 5 to 35 weight percent, b. 1 to 30 parts by weight of a liquid plasticizing agent compatible with said rubber mixture and c. 30 to 60 parts of a reinforcing agent selected from the group consisting of hydrated silica, hard clays and carbon black; said vulcanized mixture characterized as having a volume percent swell after 24 hours at 158°F in ASTM number 3 oil in the range of 1 to 40 as measured according to ASTM D-471 and a Gehman $T_{100}$ stiffness value at a temperature in the range of −30°F to −100°F as measured according to ASTM D-1053.

| Vulcanized Rubber Composition | Example Number | | | | | |
|---|---|---|---|---|---|---|
| | 1 | 2 | 3 | 4 | 5 | 6 |
| I RUBBER MIXTURE | | | | | | |
| Nitrile Rubber—Parts by Weight | 60 | 90 | 60 | 90 | 60 | 90 |
| Acrylonitrile, Weight Percent | 18 | 18 | 33 | 33 | 45 | 45 |
| Styrene-Butadiene Copolymer Parts by Weight | 40 | 10 | 40 | 10 | 40 | 10 |
| Weight Percent Acrylonitrile Content in Mixture | 10.8 | 16.2 | 9.8 | 29.7 | 27.0 | 40.5 |
| II ADDITIVES (PARTS BY WEIGHT) | | | | | | |
| di(butoxy-ethoxy-ethyl)adipate | 20.0 | 20.0 | 20.0 | 20.0 | 20.0 | 20.0 |
| Carbon Black (HAF) | 45.0 | 45.0 | 45.0 | 45.0 | 45.0 | 45.0 |
| Zinc Oxide | 5.0 | 5.0 | 5.0 | 5.0 | 5.0 | 5.0 |
| Stearic Acid | 0.5 | 0.5 | 0.5 | 0.5 | 0.5 | 0.5 |
| Phenyl Beta Naphthylamine | 1.0 | 1.0 | 1.0 | 1.0 | 1.0 | 1.0 |
| Benzothiazole Disulfide | 1.75 | 1.75 | 1.75 | 1.75 | 1.75 | 1.75 |
| Tetramethyl Thiuram Disulfide | 0.75 | 0.75 | 0.75 | 0.75 | 0.75 | 0.75 |
| Sulfur | 1.5 | 0.5 | 1.5 | 0.5 | 1.5 | 0.5 |
| III PHYSICAL PROPERTIES OF VULCANIZED MIXTURE | | | | | | |
| Gehman $T_{100}$ Stiffness, °F (ASTM D-1053) | −65 | −59 | −62 | −44 | −31 | 17 |
| Swell, Volume Percent, in ASTM Oil No. 3 After 24 Hours at 158°F (ASTM D-741) | 26 | 15 | 20 | 4 | 14 | −2 |

Example 6 not meeting either the volume percent swell or low temperature flexibility limits falls outside the scope of the present invention. The rubber compositions given in the table were blended on a standard rubber mill and cured for 30 minutes at 295°F.

Although the compositions given in the table contain styrene-butadiene copolymer, any of the other second rubber additives selected from polybutadiene, polyisoprene, neoprene and natural rubber and mixtures thereof can be substituted for the styrene-butadiene copolymer with equivalent results being obtained. Also, other rubber compatible liquid plasticizing agents as well as other suitable reinforcing agents can be substituted with equivalent results being obtained.

Compositions of the present invention are particularly suitable for use in flexible rubber conveyor belts. In particular they are useful in conveyor belts which are normally coated with liquid hydrocarbons such as kerosene when transporting tar sands. Thus the present invention includes a flexible conveyor belt particularly suited for use in transporting tar sands which belt has a A more preferred embodiment of the conveyor belt composition of the present invention comprises a flexible conveyor belt as disclosed above wherein said vulcanized mixture consists essentially of:

a. 100 parts by weight of a rubber mixture containing 40 to 90 weight percent nitrile rubber and 60 to 10 weight percent of a second rubber selected from the group consisting of polybutadiene, styrene-butadiene copolymer, neoprene, polyisoprene and natural rubber said mixture having an acrylonitrile content in the range of 5 to 35 weight percent, b. 1 to 30 parts by weight of a liquid plasticizing agent selected from the group consisting of trioctyl phosphate, dibutyl sebacate, diisooctyl sebacate, tributyl citrate, di(butoxy-ethoxy-ethyl) formal, di(butoxy-ethoxy-ethyl)adipate, dioctyl sebacate, dioctyl phthalate, dibutyl phthalate and tributoxy oxyethyl phosphate, and c. 30 to 60 parts by weight of carbon black, said vulcanized mixture characterized as having a volume percent swell after 24 hours in ASTM number 3 oil at 158°F in the range of 1 to 40 as measured according to ASTM D-471 and a Gehman $T_{100}$ stiffness value at a temperature in the range of −30°F to −100°F as measured according to ASTM D-1053.

The preferred liquid plasticizing agent for use in the flexible conveyor belt compositions herein disclosed are di(butoxy-ethoxy-ethyl)adipate and di(butoxy-ethoxy-ethyl) formal.

Other desirable physical characteristics of the rubber component of the conveyor belt are:

a. Cure time should be 20 to 40 minutes at 295°F
b. Hardness = Shore "A" should be in the range of 59 to 61 (ASTM D-2240)
c. Abrasion value should be at least 80 according to (ASTM D-2228) and
d. Tensile strength should be at least 2000 psi according to (ASTM D-412).

General procedures for preparing rubber conveyor belts are known to the art. The use of the novel rubber compositions of the present invention provides a substantial improvement in this technology.

The present invention also comprises an improved method for transporting tar sands. Specifically, the method of the present invention is an improved method for transporting tar sands in an open pit wherein ambient temperatures range between −100°F and +100°F in a manner whereby sticking of the tar sands to the surface of the belt is substantially reduced. Specifically this method comprises:

a. providing a continuous flexible rubber surfaced conveyor belt between a receiving area and a discharge area said rubber surface being characterized as having a volume percent swell after 24 hours in ASTM number 3 oil at 158°F in the range of 1 to 40 as measured according to ASTM D-471 and a Gehman $T_{100}$ stiffness value at a temperature in the range of −30°F to −100°F according to ASTM D-1053,
b. applying a thin layer of liquid hydrocarbon containing up to 30 weight percent aromatics to the upper surface of said belt immediately before contacting said surface with the tar sands to be transported thereon and thereafter
c. transporting tar sands on the surface of said belt from a receiving area to a discharge area.

The preferred method of the present invention is a method of transporting tar sands according to the method above wherein the rubber component of said rubber conveyor belt comprises those mentioned above, preferably a vulcanized mixture of:

a. 100 parts of a rubber mixture comprised of 20 to 95 weight percent nitrile rubber and 80 to 5 weight percent of a solid plasticizer selected from the group consisting of polybutene, styrene-butadiene copolymer, neoprene, polyisoprene and natural rubber said mixture having an acrylonitrile content in the range of 5 to 35 weight percent;
b. 1 to 30 parts by weight of a liquid plasticizing agent compatible with said mixture and
c. 30 to 60 parts by weight of a reinforcing agent selected from the group consisting of carbon black, hard clay and hydrated silica.

The liquid plasticizing agent is selected from the group of liquid plasticizing agents compatible with the rubber mixture disclosed above. The preferred reinforcing agent is carbon black.

Although the novel rubber compositions herein provided have been primarily disclosed for use in conveyor belts, their application is not limited to that use. The novel rubber herein disclosed is suitable for use in making pump diaphragms, pump seals, flexible couplings, gaskets and other equipment requiring low temperature flexibility and swell resistance to liquid hydrocarbons.

The invention claimed is:

1. A flexible conveyor belt particularly suited for use in transporting tar sands and having limited resistance to swelling when exposed to liquid hydrocarbons containing up to 30 weight percent aromatics said conveyor comprising a rubber belt having a plurality of metal cables longitudinally disposed in said belt and arranged substantially parallel to each other said belt having a rubber surface comprising a vulcanized mixture of:

a. 100 parts by weight of a rubber mixture containing 20 to 95 weight percent nitrile rubber and 80 to 5 weight percent of a second rubber selected from the group consisting of natural rubber, neoprene, polybutadiene, styrene-butadiene copolymer and polyisoprene said rubber mixture having an acrylonitrile content in the range of 5 to 35 weight percent,
b. 1 to 30 parts by weight of a liquid plasticizing agent compatible with said rubber mixture and
c. 30 to 60 parts of a reinforcing agent selected from hard clay and hydrated silica carbon black, said vulcanized mixture characterized as having a volume percent swell after 24 hours at 158°F in ASTM number 3 oil in the range of 1 to 40 as measured according to ASTM D-471 and a Gehman $T_{100}$ stiffness value at a temperature in the range of −30°F to −100°F as measured according to ASTM D-1053.

2. A flexible conveyor belt according to claim 1 wherein said vulcanized mixture consists essentially of:

a. 100 parts by weight of a rubber mixture containing 40 to 90 weight percent nitrile rubber and 60 to 10 weight percent of a second rubber selected from the group consisting of polybutadiene, styrene butadiene copolymer, neoprene, polyisoprene and natural rubber said mixture having an acrylonitrile content in the range of 5 to 35 weight percent,
b. 1 to 30 parts by weight of a liquid plasticizing agent selected from the group consisting of trioctyl phosphate, dibutyl sebacate, diisooctyl sebacate, tributyl citrate, di(butoxy-ethoxy-ethyl) formal, di(butoxy-ethoxy-ethyl)adipate, dioctyl sebacate, dioctyl phthalate, dibutyl phthalate and tributoxy oxyethyl phosphate, and
c. 30 to 60 parts by weight of carbon black per 100 parts of rubber said vulcanized mixture characterized as having a volume percent swell after 24 hours at 158°F in ASTM number 3 oil in the range of 1 to 40 as measured according to ASTM D-471 and a Gehman $T_{100}$ stiffness value at a temperature in the range of −30°F to −100°F as measured according to ASTM D-1053.

3. An improved method for transporting tar sands in a manner whereby sticking of the tar sands to the surface of the belt is substantially reduced comprising:

a. providing a continuous flexible rubber surfaced conveyor belt according to the composition of claim 1 between a receiving area and a discharge area said rubber surface being characterized as having a volume percent swell after 24 hours at 158°F in ASTM number 3 oil in the range of 1 to 40 as measured according to ASTM D-471 and a Gehman $T_{100}$ stiffness value at a temperature in the range of −30°F to −100°F according to ASTM D-1053,
b. applying a thin layer of liquid hydrocarbon containing a maximum of 30 weight percent aromatics to the upper surface of said belt immediately before contacting said surface with the tar sands to be transported and thereafter,
c. transporting tar sands on the surface of said belt from a receiving area to a discharge area.

4. A method according to claim 3 wherein said reinforcing agent is carbon black and said liquid plasticizer is selected from the group consisting of trioctyl phosphate, dibutyl sebacate, diisooctyl sebacate, tributyl citrate, di(butoxy-ethoxy-ethyl) formal, di(butoxy-ethoxy-ethyl)adipate, dioctyl sebacate, dioctyl phthalate, dibutyl phthalate and tributoxy oxyethyl phosphate.

* * * * *

UNITED STATES PATENT OFFICE
CERTIFICATE OF CORRECTION

PATENT NO. : 3,963,113

DATED : June 15, 1976

INVENTOR(S) : JACKSON S. BOYER

It is certified that error appears in the above-identified patent and that said Letters Patent are hereby corrected as shown below:

Column 4, line 15 insert a "+" in front of the first 100F and a "-" in front of the second 100F.

Column 4, line 34 insert a "-" in front of 100F.

Signed and Sealed this

Fourteenth Day of September 1976

[SEAL]

Attest:

RUTH C. MASON
*Attesting Officer*

C. MARSHALL DANN
*Commissioner of Patents and Trademarks*